Patented June 16, 1936

2,044,329

UNITED STATES PATENT OFFICE 2,044,329

AZO DYES AND THEIR PRODUCTION

Max Raeck, Dessau-Haideburg in Anhalt, and Alfred Thurm, Dessau in Anhalt, Germany, assignors to General Aniline Works, Inc., New York, N. Y., a corporation of Delaware No Drawing. Application December 14, 1934, Serial No. 757,563. In Germany February 25, 1933

12 Claims. (Cl. 260—38.5)

Our present invention relates to new azo dyes which correspond to the general formula

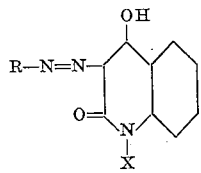

in which R means a diazo component of the benzene series and X is an aliphatic hydrocarbon radicle with more than three carbon atoms.

A further object of our invention is a process for manufacturing these new dyes.

Dyes of the general formula given above, are distinguished by their good solubility in organic solvents, lacquers, fats, oils, resins, waxes and products obtained therewith and furthermore by the clarity of their tints, by their high coloring power and by a very satisfactory fastness to sublimation. Particularly valuable, on account of their greenish yellow tint, are the dyes from diazotized aniline.

The following examples illustrate the invention, the parts being by weight.

*Example 1.*—9.3 parts of aminobenzene are diazotized in the usual manner and the diazo compound is allowed to run to a solution of 23 parts of N-n-butyl-4-hydroxy-2-quinolone dissolved in 240 parts of water under addition of 33 parts of calcined sodium carbonate. The dye thus obtained is recovered in the usual manner; it dyes organic solvents, waxes, and similar products clear greenish yellow tints.

*Example 2.*—16.2 parts of 2,5-dichloro-1-aminobenzene are diazotized and coupled at 0 to 5° C. with 23 parts of N-n-butyl-4-hydroxy-2-quinolone dissolved in 240 parts of water under addition of 33 parts of calcined sodium carbonate. If coupling has finished, the dye is filtered with suction and butylhydroxyquinolone in excess is washed away with a diluted solution of sodium carbonate. The dye is then washed with water until neutral.

*Example 3.*—21.9 parts of meta-aminobenzoic acid cyclohexylester are diazotized and coupled as described in Example 1, with 23 parts of N-n-butyl-4-hydroxy-2-quinolone. The finished dye, likewise, dyes greenish yellow tints.

A dye with nearly the same qualities is obtainable if substituting for the N-n-butylhydroxyquinolone the corresponding isobutyl compound.

*Example 4.*—When coupling the diazo compound prepared from 12.7 parts of 2-chloro-1-aminobenzene with N-butyl-4-hydroxy-2-quinolone, a dye with similar properties is obtained.

*Example 5.*—26.3 parts of the para-toluolsulfonic acid ester of 1-amino-2-hydroxybenzene are diazotized. After filtration, the diazo solution is combined with N-butyl-4-hydroxy-2-quinolone.

*Example 6.*—9.3 parts of aminobenzene are diazotized and united with a solution of 26.4 parts of N-benzyl-4-hydroxy-2-quinolone containing sodium carbonate. The dye is recovered in the usual manner.

*Example 7.*—The diazo compound of 9.3 parts of aminobenzene is allowed to run into an aqueous solution containing 25.7 parts of N-isohexyl-4-hydroxy-2-quinolone and 33 parts of sodium carbonate. The dye separates in form of a resin. In order to remove the quinolone in excess, the dye is washed several times with warm water.

The present specification is a continuation-in-part of our copending application Serial No. 710,371, filed February 8, 1934, where the manufacture of a part of our new dyes is described.

What we claim is:—

1. The azo dyes of the general formula

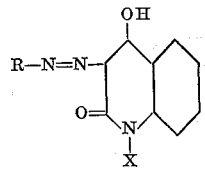

wherein R means a radicle of the benzene series free from sulfonic and carboxylic acid groups and X is the radicle of an aliphatic hydrocarbon with more than three carbon atoms, these dyes being insoluble in water and dyeing organic solvents, lacquers, fats, oils, resins, waxes and products obtained therewith clear greenish yellow tints.

2. The azo dyes of the general formula

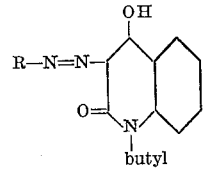

wherein R means a radicle of the benzene series free from sulfonic and carboxylic acid groups, these dyes being insoluble in water and dyeing organic solvents, lacquers, fats, oils, resins, waxes and products obtained therewith clear greenish yellow tints.

3. The azo dyes of the general formula

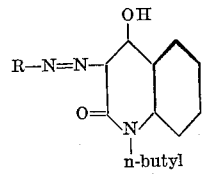

wherein R means a radicle of the benzene series free from sulfonic and corboxylic acid groups, these dyes being insoluble in water and dyeing organic solvents, lacquers, fats, oils, resins, waxes and products obtained therewith clear greenish yellow tints.

4. The dye corresponding to the formula

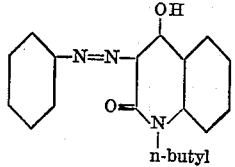

said dye being insoluble in water and dyeing organic solvents, lacquers, fats, oils, resins, waxes and products obtained therewith clear greenish yellow tints.

5. The dye corresponding to the formula

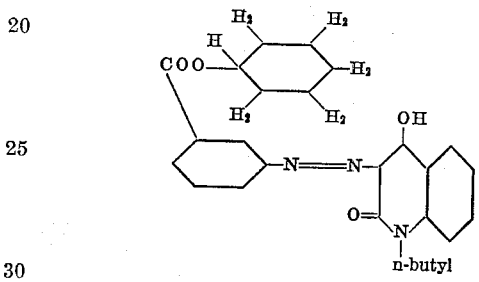

said dye being insoluble in water and dyeing organic solvents, lacquers, fats, oils, resins, waxes and products obtained therewith clear greenish yellow tints.

6. The dye corresponding to the formula

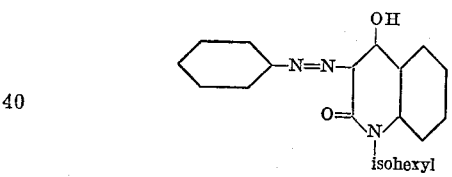

said dye being insoluble in water and dyeing organic solvents, lacquers, fats, oils, resins, waxes and products obtained therewith clear greenish yellow tints.

7. The process which comprises diazotizing a water-insoluble amine of the benzene series and coupling the diazo compound with a hydroxyquinolone of the general formula

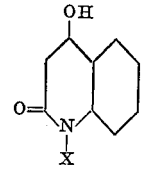

wherein X is the radicle of an aliphatic hydrocarbon with more than three carbon atoms.

8. The process which comprises diazotizing an amine of the benzene series free from sulfonic and carboxylic acid groups, and coupling the diazo compound with a hydroxyquinolone of the general formula

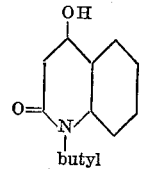

9. The process which comprises diazotizing an amine of the benzene series free from sulfonic and carboxylic acid groups, and coupling the diazo compound with N-n-butyl-4-hydroxy-2-quinolone.

10. The process which comprises diazotizing aniline and coupling the diazobenzene with N-n-butyl-4-hydroxy-2-quinoline.

11. The process which comprises diazotizing meta-aminobenzoic acid cyclohexylester and coupling the diazo compound with N-n-butyl-4-hydroxy-2-quinolone.

12. The process which comprises diazotizing aniline and coupling the diazobenzene with N-isohexyl-4-hydroxy-2-quinolone.

MAX RAECK.
ALFRED THURM.